(12) United States Patent
Bria

(10) Patent No.: US 6,264,464 B1
(45) Date of Patent: Jul. 24, 2001

(54) ANGLED BED FOR REGENERATIVE HEAT EXCHANGER

(75) Inventor: Michael P. Bria, Green Bay, WI (US)

(73) Assignee: Megtec Systems, Inc., Depere, WI (US)

(*) Notice: Subject to any disclaimer, the term of this patent is extended or adjusted under 35 U.S.C. 154(b) by 0 days.

(21) Appl. No.: 09/569,554

(22) Filed: May 12, 2000

(51) Int. Cl.[7] ............................................. F23D 11/44
(52) U.S. Cl. ........................ 431/215; 431/170; 165/9.3; 165/9.4; 432/180; 432/214
(58) Field of Search .................. 431/215, 5, 7, 431/11, 326, 328, 268, 170; 432/180, 181, 182, 214; 165/9.1, 9.2, 9.4, 166; 52/603, 609, 611; 428/167; 422/171, 179, 221; 126/400

(56) References Cited

U.S. PATENT DOCUMENTS

| | | | |
|---|---|---|---|
| 1,421,259 | 6/1922 | Kuhn | 165/9.3 |
| 1,703,793 * | 2/1929 | Stein | 165/9.4 |
| 1,753,467 * | 4/1930 | Kniepert | 165/9.1 |
| 1,799,856 | 4/1931 | McGee | 165/9.3 |
| 1,848,242 | 3/1932 | Claassen | 165/9.2 |
| 1,895,302 * | 1/1933 | Wheeler et al. | 165/9.1 |
| 1,961,510 * | 6/1934 | Ryan | 165/9.4 |
| 2,823,027 * | 2/1958 | Coberly | 165/9.4 |
| 3,369,593 | 2/1968 | Brandt | 165/10 |
| 3,384,359 * | 5/1968 | Potocnik | 165/9.1 |
| 3,572,425 | 3/1971 | Brandt et al. | 165/9 |
| 4,067,190 * | 1/1978 | Hamm et al. | 431/170 |
| 4,108,733 * | 8/1978 | Gerber | 165/9.1 |
| 4,118,199 * | 10/1978 | Volker et al. | 422/171 |
| 4,581,206 * | 4/1986 | Otani et al. | 422/171 |
| 5,403,559 * | 4/1995 | Swars | 422/171 |
| 5,693,295 * | 12/1997 | Foster | 422/171 |
| 5,755,569 * | 5/1998 | Berg et al. | 165/9.1 |
| 5,851,636 | 12/1998 | Lang et al. | 428/167 |

* cited by examiner

Primary Examiner—Ira S. Lazarus
Assistant Examiner—Josiah C. Cocks
(74) Attorney, Agent, or Firm—Mitchell D. Bittman; Kevin S. Lemack

(57) ABSTRACT

The present invention relates to one or more heat exchangers in communication with a combustion zone, each heat exchanger containing a matrix of heat exchange media, the matrix having a plurality of defined parallel or substantially parallel flow passages, the matrix being angled slightly above horizontal in the direction towards the combustion zone. The present invention is also directed to a regenerative thermal oxidizer including the one or more heat exchangers containing the angled matrix.

18 Claims, 5 Drawing Sheets

Horizontal Monolith Heat Exchanger for a Regenerative Oxidizer.

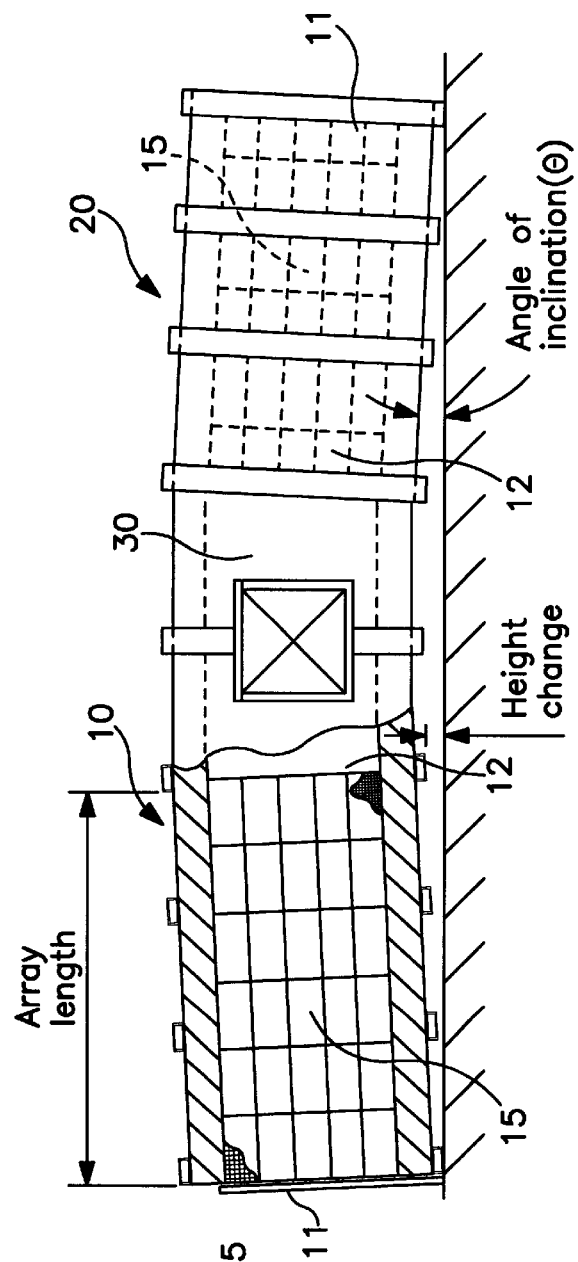
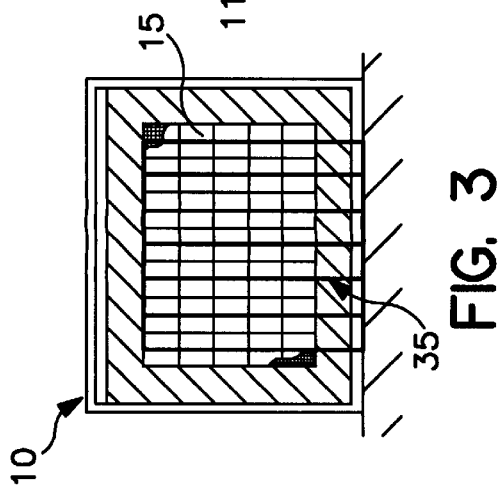

ANGLED BED FOR REGENERATIVE HEAT EXCHANGER

BACKGROUND OF THE INVENTION

The present invention relates to the arrangement of heat exchange media in regenerative thermal oxidizers (RTOs), and the resulting improved thermal oxidizers.

Regenerative thermal oxidizers are generally used for destroying volatile organic compounds (VOCs) in high flow, low concentration emissions from industrial and power plants. RTOs typically require high oxidation temperatures in order to achieve high VOC destruction and high heat recovery efficiency. To more efficiently attain these characteristics, the "dirty" process gas which is to be treated is preheated before oxidation in a heat exchanger column. The column is usually packed with a heat exchange material having good thermal and mechanical stability and high thermal mass. In operation, the process gas is fed through a previously heated heat exchanger column, which, in turn, heats the process gas to a temperature approaching or attaining its VOC oxidation temperature. This pre-heated process gas is then directed into a combustion zone where VOC oxidation is usually completed, if necessary. The treated "clean" gas is then directed out of the combustion zone and back through the heat exchanger column, or, according to a more efficient process, through a second heat exchange column. As the hot oxidized gas is fed through this second column, the gas transfers its heat to the heat exchange media in that column, cooling the gas and pre-heating the heat exchange media so that another batch of process gas may be preheated through the second column after the oxidizer is cycled. Usually, an RTO has at least two heat exchanger columns which alternately receive process and treated gases. This process is continuously carried out, allowing process gas to be efficiently treated.

The performance of an RTO may be optimized by increasing VOC destruction efficiency and by reducing operating and capital costs. The art of increasing VOC destruction efficiency has been addressed in the literature using, for example, means such as improved oxidation systems and purge systems. Operating costs can be reduced by increasing the heat recovery efficiency, and by reducing the pressure drop across the oxidizer. Operating and capital costs may be reduced by properly designing the RTO and by selecting appropriate heat transfer packing materials. While design aspects of RTOs have been the subject of prior patent literature, the arrangement of the heat transfer packing material has not been sufficiently addressed.

A horizontal arrangement for a heat exchanger may be used in applications such as a regenerative oxidizer as shown in FIG. 1. The oxidizer includes two opposed heat exchangers with a central combustion zone on communication with each. Each heat exchanger is composed of a matrix of stacked monolith blocks having a plurality of usually parallel vapor flow passages for process gas flow. The stacked blocks are appropriately aligned so that their vapor flow passages line up, defining a plurality of passageways from the heat exchanger column inlet to the outlet. However, such an arrangement can have a problem with high drag forces on the media blocks at the hot end of the heat exchange matrix (i.e., the end farthest from the inlet (or outlet, as the case may be) and closest to the combustion zone.

For a combination of high temperature and high air velocity, the drag force can be large enough to cause a media block to move out of the matrix, especially if the block has a slight downward tilt from the horizontal. These forces may cause cracking and premature failure of the monoliths resulting in costly, unscheduled downtime of the RTO and replacement of the monoliths, or at a minimum, downtime necessary to properly arrange the now altered matrix. This problem does not occur in heat exchangers wherein the matrix is vertically arranged (i.e., the gas flow is vertical through the matrix), since the gravitational forces due to the weight of the matrix resist such forces.

This problem in horizontal beds might be addressed by binding the matrix together such as with mortar, and by using expanding material to produce a compressive force on the matrix and hold it in place. Over time, however, both of these methods may fail, especially in view of the high temperature environment of the heat exchanger beds. Indeed, the mortar may breakdown or crack and the compressive force induced by the expanding material may relax.

It is therefore an object of the present invention to provide an arrangement of heat exchange media which allows for the horizontal or substantially horizontal flow of process gas from inlet to outlet, but counters the drag forces which may occur.

SUMMARY OF THE INVENTION

The problems of the prior art have been overcome by the present invention, which is directed to one or more heat exchangers in communication with a combustion zone and containing a matrix of heat exchange media, the matrix having a plurality of defined parallel or substantially parallel flow passages, the matrix being angled slightly above horizontal in the direction towards the combustion zone. The present invention is also directed to a regenerative thermal oxidizer including the one or more heat exchangers containing the angled matrix.

BRIEF DESCRIPTION OF THE DRAWINGS

FIG. 2 is a cross-sectional view of a horizontal regenerative thermal oxidizer in accordance with the present invention;

FIG. 3 is an end view of a horizontal regenerative thermal oxidizer in accordance with one embodiment of the present invention;

DETAILED DESCRIPTION OF THE INVENTION

Figure 1:
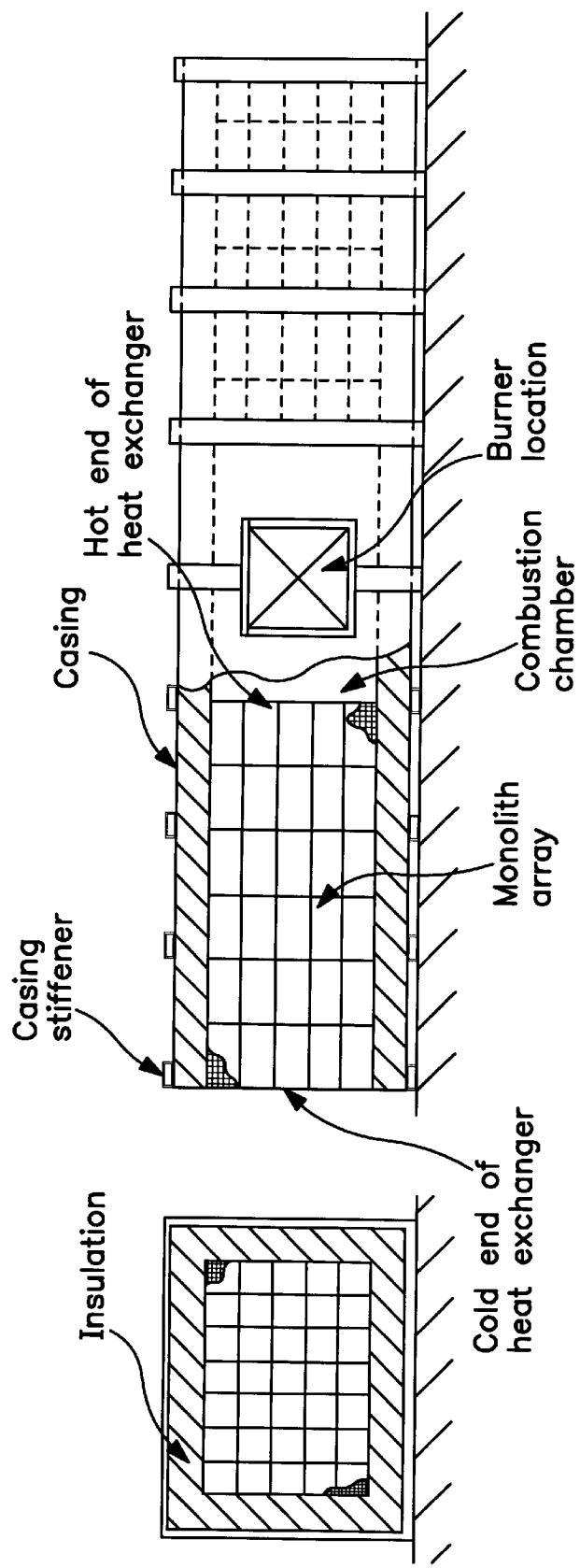
FIG. 1 is a cross-sectional view of a horizontal regenerative thermal oxidizer in accordance with the prior art.

Turning now to FIG. 2, there is shown one embodiment of the present invention wherein there are two heat exchangers 10, 20 in fluid communication with a centrally located combustion zone 30. This embodiment is similar to that shown in FIG. 1, except for the positioning of the heat exchange media. Each heat exchanger includes a cold end 11 and a hot end 12. The cold end 11 serves as an inlet for relatively cool process gas containing VOC's to be oxidized, or as an outlet for relatively cool process gas whose VOC's have been oxidized, depending upon the cycle of the oxidizer at any given time. Spaced from each cold end 11 is a hot end 12, which in each case is nearest the combustion zone 30. Between the cold end 11 and hot end 12 of each heat exchanger, a matrix of refractory heat exchange media is placed. In the preferred embodiment, the matrix 15 of heat exchange media is one or more monolithic blocks, each having a plurality of defined vapor flow passages. The heat exchange columns are arranged on opposed sides of the combustion zone 30 such that axial gas flow passages in the heat exchange media in one of the columns extends in a direction towards the other column. Most preferably, the matrix 15 consists of a plurality of stacked monolithic blocks, the blocks being stacked such that their vapor flow passages are axially aligned, thereby allowing process gas flow from the cold end of each bed to the hot end of each bed, or vice versa. Monolithic structures suitable for the matrix 15 include those having about 50 cells/in$^2$ and allowing for laminar flow and low pressure drop. Such blocks have a series of small channels or passageways formed therein allowing gas to pass through the structure in predetermined paths, generally along an axis parallel to the flow of gas through the heat exchange column. More specific examples of suitable monolithic structures are mullite ceramic honeycombs having 40 cells per element (outer dimensions 150 mm×150 mm) commercially available from Frauenthal Keramik A.G.; and monolithic structures having dimensions of about 5.25"×5.25"×12.00". These latter blocks contain a plurality of parallel squared channels (40–50 channels per square inch), with a single channel cross section of about 3 mm×3 mm surrounded by an approximately 0.7 mm thick wall. Thus, a free cross section of approximately 60–70% and a specific surface area of approximately 850 to 1000 m$^2$/m$^3$ can be determined. Also suitable are monolithic blocks having dimensions of 5.90"× 5.90"×11.81".

In order to counter the drag forces that are encountered especially at the hot end 12 of each of the heat exchange columns, the matrix 15 of media is angled slightly above the horizontal as shown in FIG. 2. The angle is most profound at the hot end of the exchangers where the drag forces are the most significant. Suitable angles are from about 1 about 10 degrees of horizontal, with an angle of from about 1 to 5 degrees being preferred, and an angle of about 1.6 degrees being most preferred for a bed six feet in length. The resulting angle of 1.6 degrees is the preferred angle in such a system to minimize the height of the unit. The magnitude of the gravitational force for the conditions given will be larger than the expected drag force. This opposing force will not deteriorate over time. Those skilled in the art will appreciate that determination of the optimum angle of incline will depend in part on the material density of the particular matrix for a given channel count per inch and flow rate. Less dense materials need more inclination.

Preferably the angle of inclination is constant over the length of the matrix. That is, the height of the matrix preferably increases (relative to the substrate supporting it) uniformly from the cold end to the hot end of the column.

Figure 4:
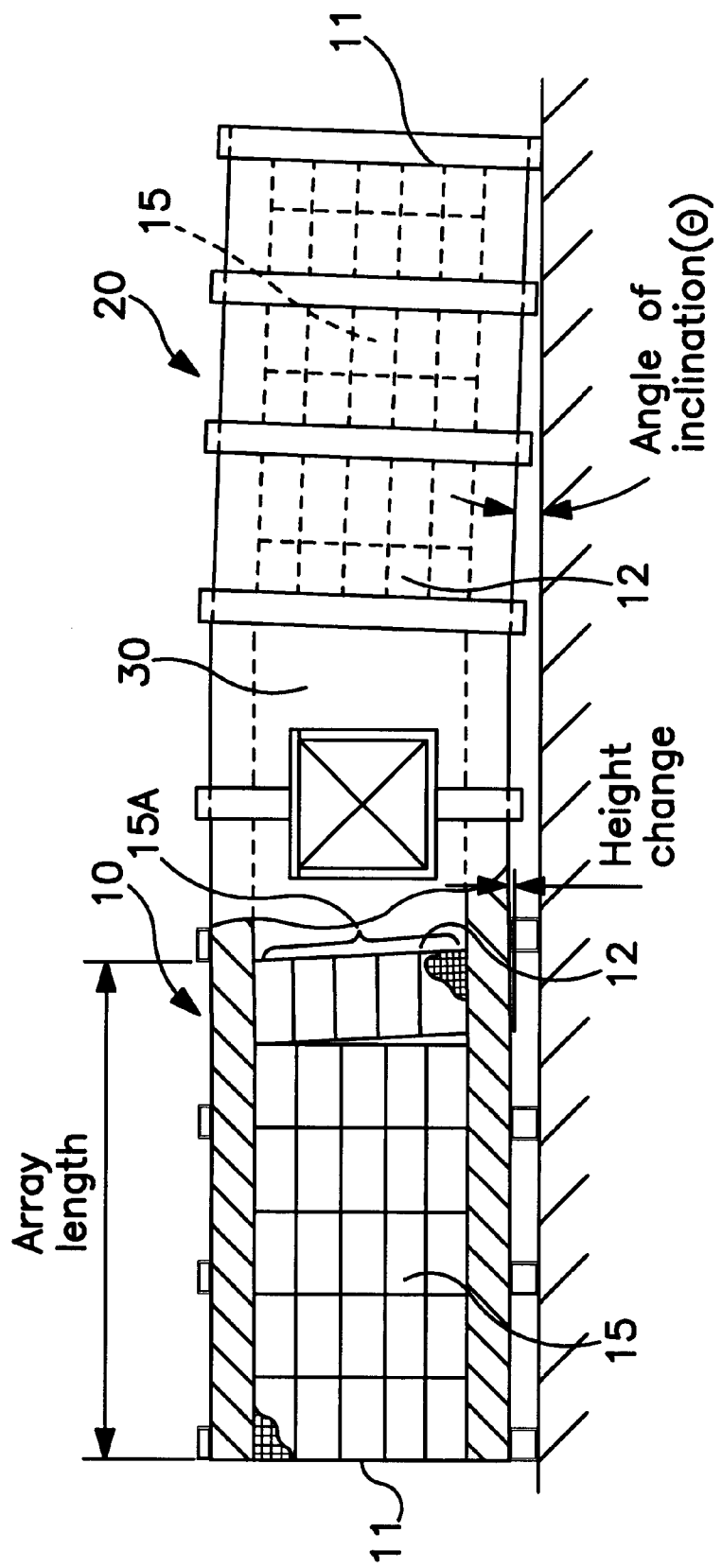
FIG. 4 is a cross-sectional view of a horizontal regenerative thermal oxidizer in accordance with an alternative embodiment of the present invention.

FIG. 4 illustrates another embodiment of the present invention, where only a portion of the heat exchange matrix 15 is angled. More specifically, the matrix is a plurality of vertically stacked monolithic blocks, with the stack 15A closest to the combustion zone 30 being angled, and the remainder of the stack or stacks being level or substantially level with horizontal. This design has the advantage of less height increase for a given angle of inclination, since the height change is proportional to the length of the bed which is inclined. In addition, this design is not likely to require a cold end support grid 35. Although the flow passages of the angled stacks do not exactly axially align with the flow passages of the stacks not angled (or at a different angle), the alignment is substantial enough to allow sufficient gas flow for the system to operate effectively. In fact, if flow enters the hot end with some significant non-uniformity, the slight gap between the stacks of monolith blocks may allow the flow to redistribute more uniformly. Those skilled in the art will appreciate that similar designs, wherein several, but not all, of the stacks of matrix 15 are positioned at an inclination to horizontal are within the scope of the present invention. For example, the two, three or four stacks of matrix 15 closest to the combustion zone 15 as shown in FIG. 4 could be angled rather than just one.

Figure 5:
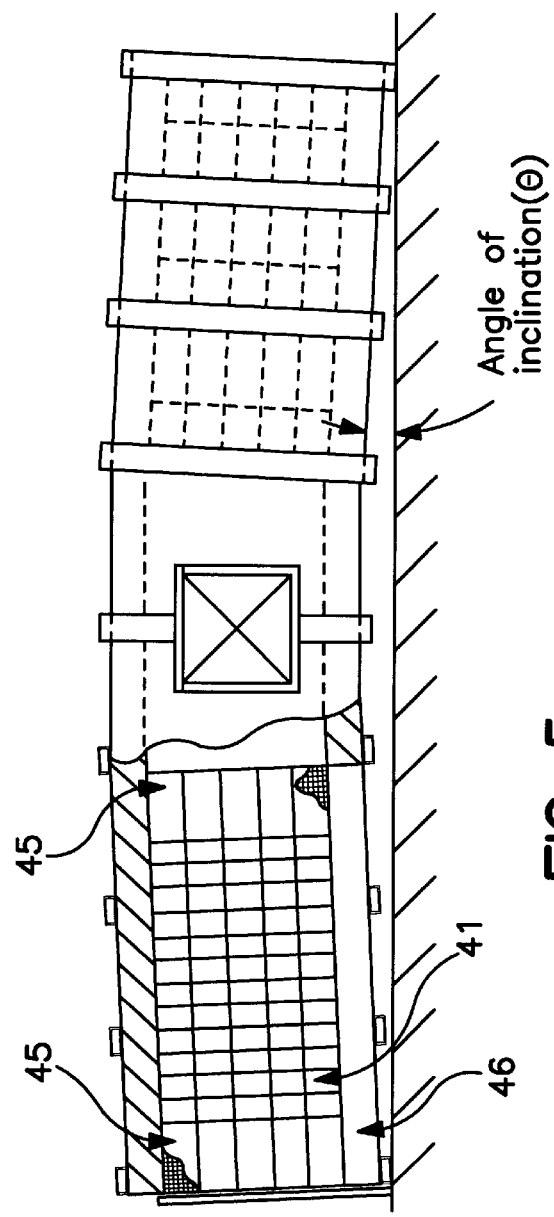
FIG. 5 is a cross-sectional view of a horizontal regenerative thermal oxidizer in accordance with still another alternative embodiment of the present invention.
Figure 6:
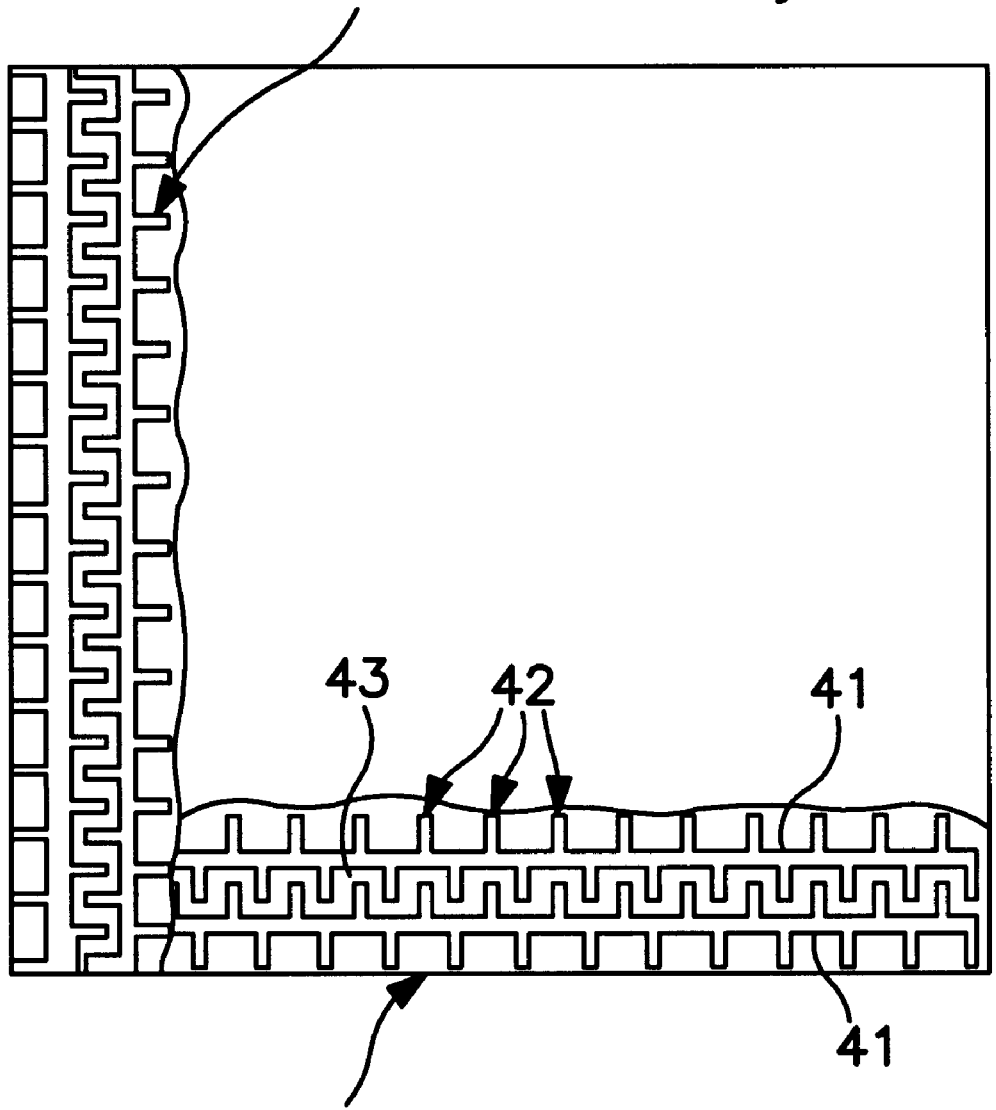
FIG. 6 is a cross-sectional view of the heat exchange matrix of the embodiment of FIG. 5.

FIGS. 5 and 6 illustrates another embodiment of the heat exchange matrix that could be used in the present invention. In this embodiment, the matrix is multi-layer and includes a stack of ceramic (or other heat refractory material) preferably planar plates 41 having a plurality of parallel ribs 42. The plates 41 are stacked, and thus the ribs 42 extending from each plate 41 are interleaved so as to form parallel grooves 43 therebetween. The ribs 42 extend from a surface of each plate 41, and the outer ends of each rib contact an opposing surface of an opposing plate 41. The formed grooves 43 are wider than the opposed rib and about the same height as the ribs. Such media is commercially available from Lantec Products, Inc. and is disclosed in U.S. Pat. No. 5,851,636, the disclosure of which is hereby incorporated herein by reference. As seen in FIG. 5, preferably the stack of plates is preferably enveloped between one or more stacks of monolithic blocks 45 at the cold end 11 and one or more stacks of monolithic blocks 45 at the hot end 12 of the heat exchange bed. The stacks of monolithic blocks help stabilize and secure the stack of plates 41. A gap between the stack 45 of monolithic blocks and the stack of plates 41 may be provided in order to ensure uniform distribution of the process gas as it flows from the axial flow passages in the monolithic blocks toward the channels formed in the stack of plates 41. Firebrick insulating support 46 can be provided to support the stack of plates 41.

The method of forming the suitable angle is not particularly limited; the angle can be formed by creating an angled floor 40 in the heat exchange column, or by supporting the matrix on one or more suitable supports, for example. As a result of the angle, a component of the weight of the matrix can resist the drag force generated and prevent movement of the matrix during operation of the oxidizer.

In the event that the cold side of the matrix requires restraint, a wire mesh or steel grid of high open area (50%–90%) can be used, since the high temperatures encountered on the hot side are not encountered on the cold side, and degradation of these restraining materials is not problematic. Such an option is illustrated in FIG. 3, where steel grid 35 is shown supporting the matrix 15.

The angled bed arrangement allows the monolithic matrix to have many of the attributes of a vertical bed system where the media is fixed by gravitational forces, such as ease of assembly and repair. In addition, the design remains nearly the height of a horizontal unit and reduces the complexity of the bed assembly. The life span of the matrix array is improved by minimizing the potential for failure caused by deterioration of other restraining methods.

What is claimed is:

1. A regenerative oxidizer, comprising:
    at least one heat exchange column in communication with
        a combustion zone, said heat exchange column having a first end and a second end spaced from said first end, said second end being nearer to said combustion zone than said first end; and a matrix of heat exchange media in said heat exchange column, said matrix being arranged in said heat exchange column such that at least a portion of the matrix nearer said second end is inclined with respect to horizontal, said matrix having a plurality of gas flow passages arranged between said first end and said second end of said heat exchange column such that the flow of gas through said passages is substantially horizontal, said matrix having a plurality of heat exchange elements arranged in a direction perpendicular to the direction of gas flow through said gas flow passages.

2. The regenerative oxidizer of claim 1, wherein said portion of said matrix nearer said second end is inclined at an angle greater than the angle at which said matrix nearer said first end is inclined.

3. The regenerative oxidizer of claim 1, wherein said angle at which said matrix nearer said first end is inclined is 0°, and said angle at which said matrix nearer said second end is inclined is 1 to 10°.

4. The regenerative oxidizer of claim 1, wherein said angle at which said matrix nearer said second end is inclined is 1.6°.

5. The regenerative oxidizer of claim 1, wherein the angle of inclination of said matrix is constant from said first end to said second end.

6. The regenerative oxidizer of claim 1, 2 or 3, wherein said matrix comprises a plurality of monolithic blocks, each having a plurality of passageways along an axis parallel to the flow of gas through said heat exchange column.

7. The regenerative oxidizer of claim 6, wherein said plurality of monolithic blocks are stacked, and wherein said stack nearest said second end is inclined with respect to horizontal.

8. The regenerative oxidizer of claim 1, 2, or 3, wherein said matrix comprises first and second plates, each having a plurality of ribs extending therefrom, said plates being arranged with respect to one another such that a plurality of grooves are formed between said plurality of ribs.

9. A regenerative thermal oxidizer for oxidizing contaminants in a gas, comprising:
    a combustion zone;
    a first heat exchange bed in communication with said combustion zone and having a first end and a second end, said second end being closer to said combustion zone than said first end;
    a second heat exchange bed in communication with said combustion zone and having a first end and a second end, said second end being closer to said combustion zone than said first end;
    heat exchange media supported in each of said first and second heat exchange beds such that at least a portion of said heat exchange media closer to said second ends of said first and second heat exchange columns is at an angle of about 1 to 10° relative to horizontal, said media having a plurality of gas flow passage arranged between said first end and said second end of said heat exchange column such that the flow of gas through said passage is substantially horizontal; said media comprising a matrix having a plurality of heat exchange elements arranged in a direction perpendicular to the direction of gas flow through said gas flow passages.

10. The regenerative oxidizer of claim 9, wherein said heat exchange media closer to said first ends of said first and second heat exchange columns is substantially parallel to horizontal.

11. The regenerative oxidizer of claim 9, wherein said angle is 1.6°.

12. The regenerative oxidizer of claim 9, wherein said heat exchange media comprises a plurality of monolithic blocks, each having a plurality of passageways along an axis parallel to the flow of said gas through the heat exchange column.

13. The regenerative oxidizer of claim 12, wherein said plurality of monolithic blocks are stacked, and wherein said stack nearest said second end is inclined with respect to horizontal.

14. The regenerative oxidizer of claim 9, wherein said heat exchange media comprises a plurality of plates, each having a plurality of ribs extending therefrom, said plates being arranged with respect to one another such that a plurality of grooves are formed between said plurality of ribs.

15. The regenerative oxidizer of claim 14, wherein said matrix further comprises a plurality of monolithic blocks, each having a plurality of passageways along an axis parallel to the flow of said gas through the heat exchange column.

16. The regenerative oxidizer of claim 15, wherein said plurality of plates is positioned between a first stack of said monolithic blocks at said first end and a second stack of monolithic blocks at said second end.

17. The regenerative oxidizer of claim 15, wherein said plurality of grooves are aligned with said plurality of passageways.

18. A regenerative oxidizer, comprising:
    at least one heat exchange column in communication with a combustion zone, said heat exchange column having a first end and a second end spaced from said first end, said second end being nearer to said combustion zone than said first end; and
    a matrix of heat exchange media in said heat exchange column, said matrix being arranged in said heat exchange column such that at least a portion of the matrix nearer said second end is inclined with respect to horizontal, said matrix having a plurality of gas flow passages arranged between said first end and said second end of said heat exchange column such that the flow of gas through said passages is substantially horizontal, said matrix nearer said second end being inclined at an angle greater than the angle at which the matrix nearer said first end is inclined.

* * * * *